C. C. JACOBS.
EXCAVATOR.
APPLICATION FILED APR. 3, 1908.
1,032,834.
Patented July 16, 1912.
8 SHEETS—SHEET 4.
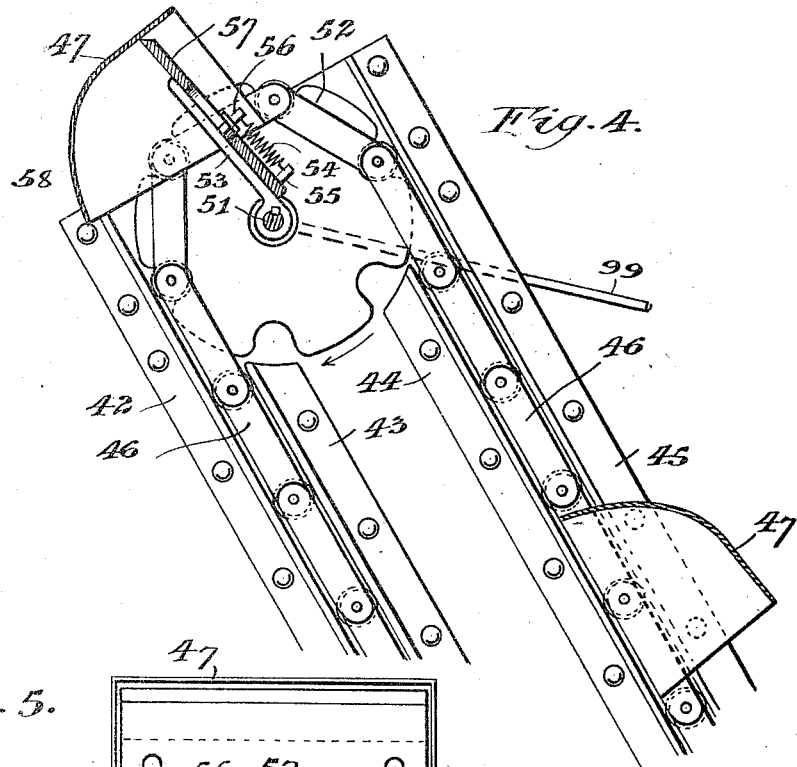
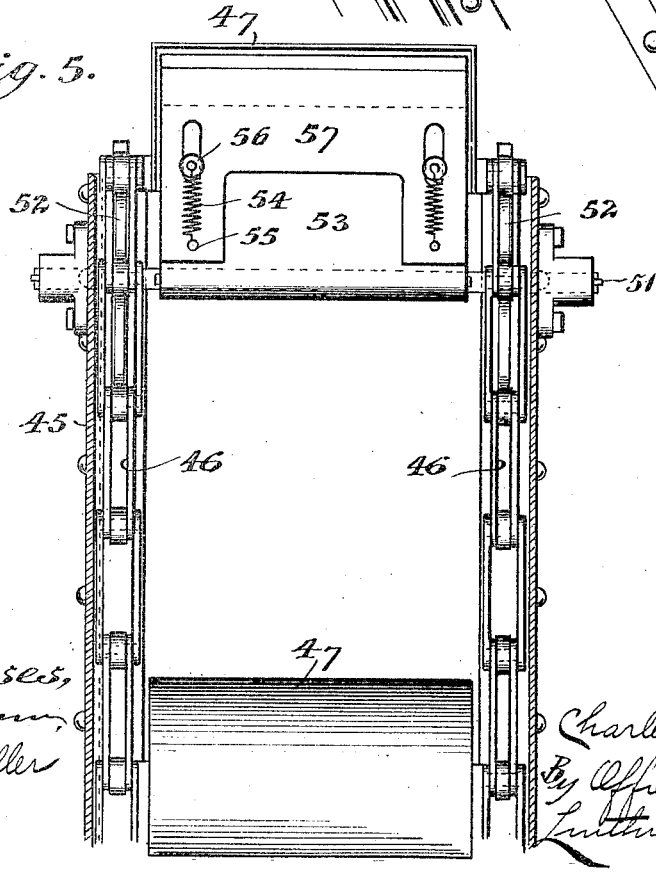

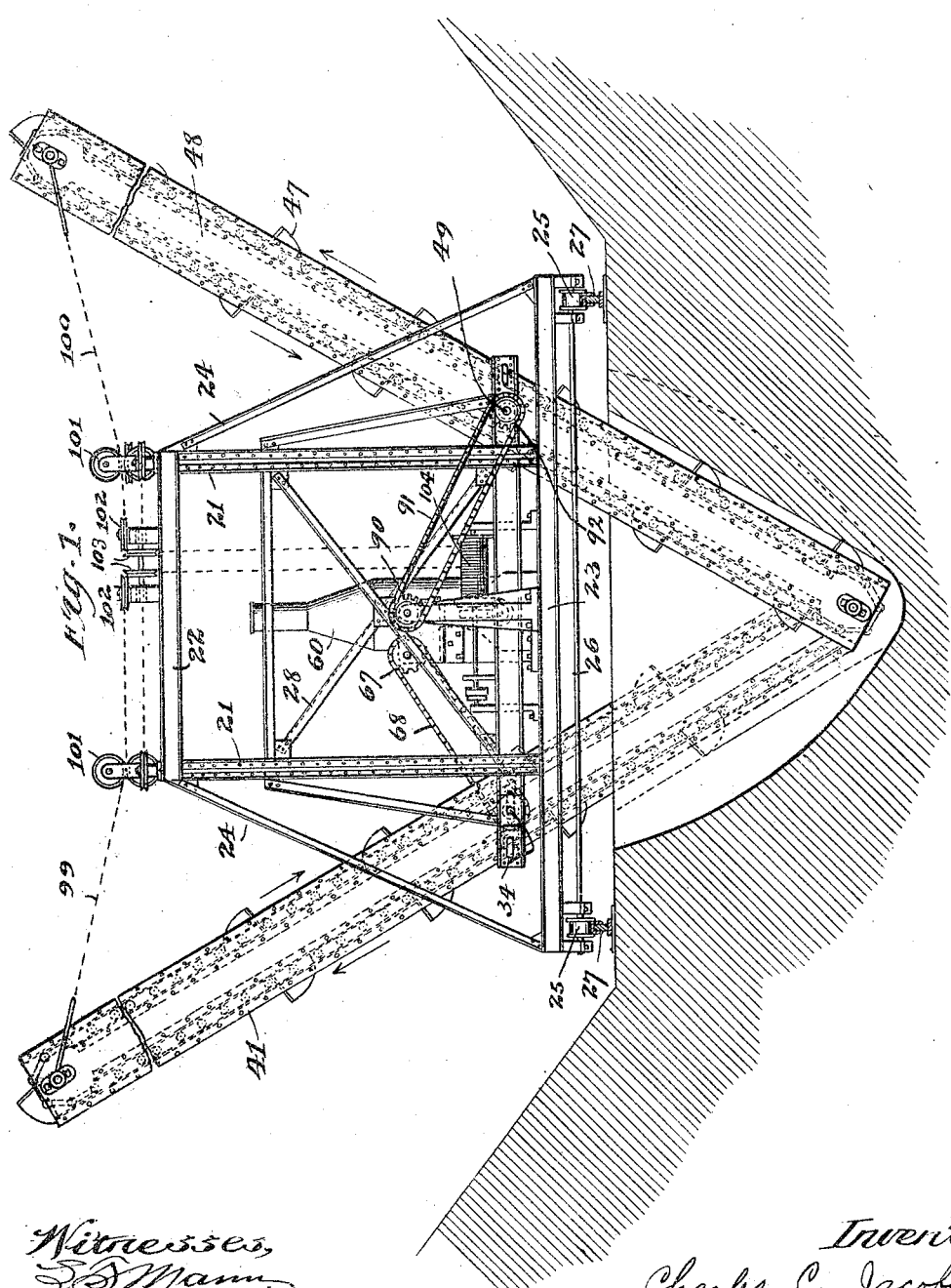

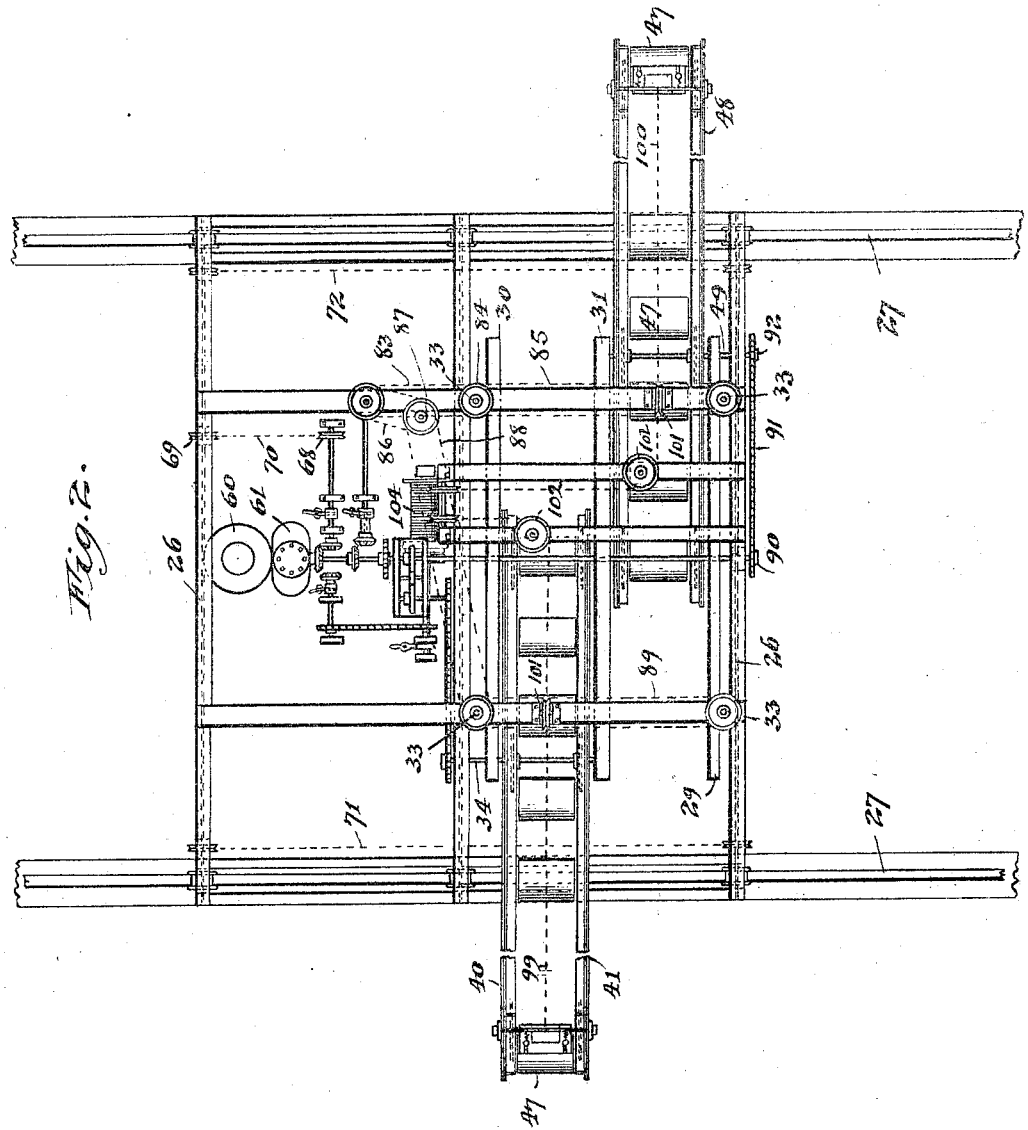

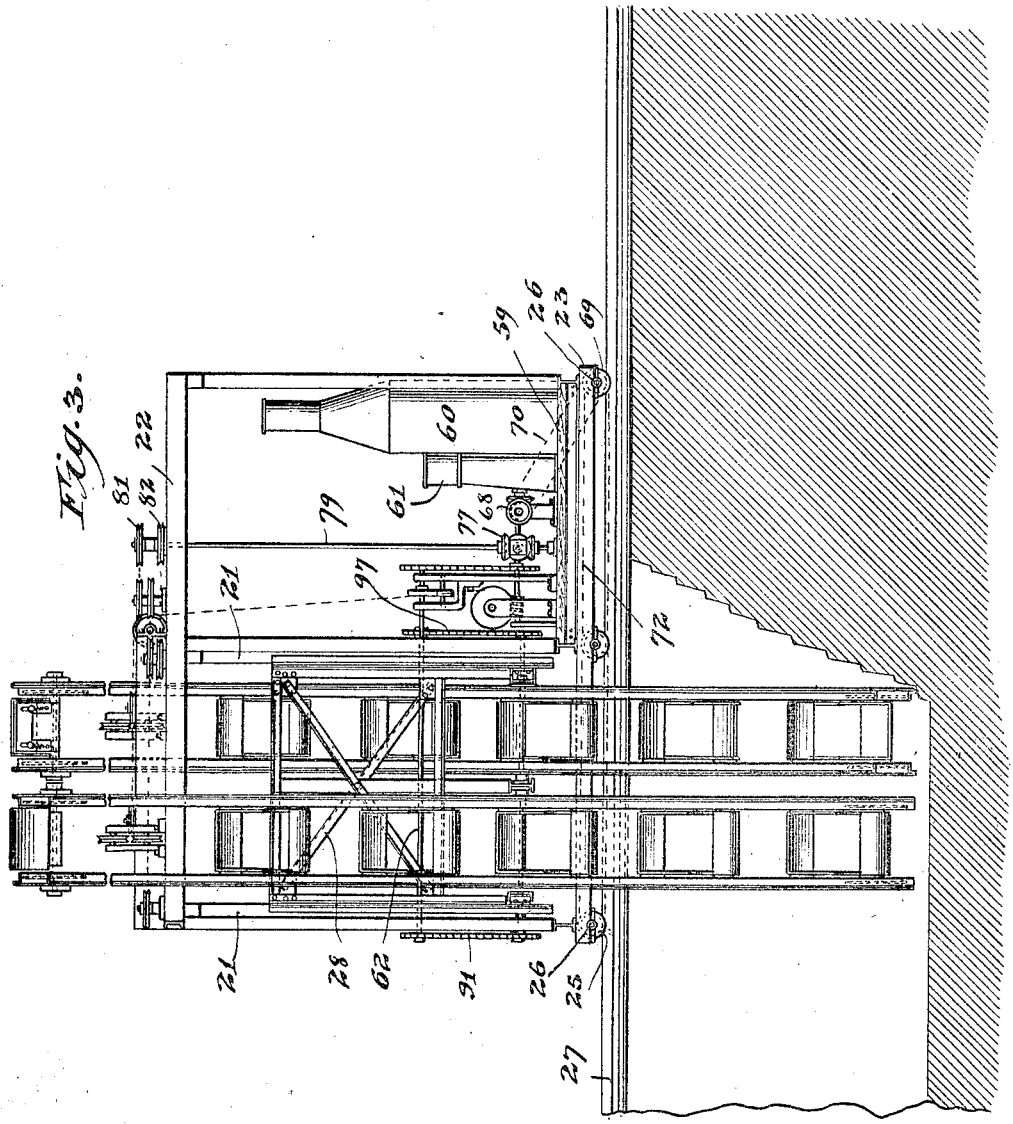

C. C. JACOBS.
EXCAVATOR.
APPLICATION FILED APR. 3, 1908.
1,032,834.
Patented July 16, 1912.
8 SHEETS—SHEET 5.
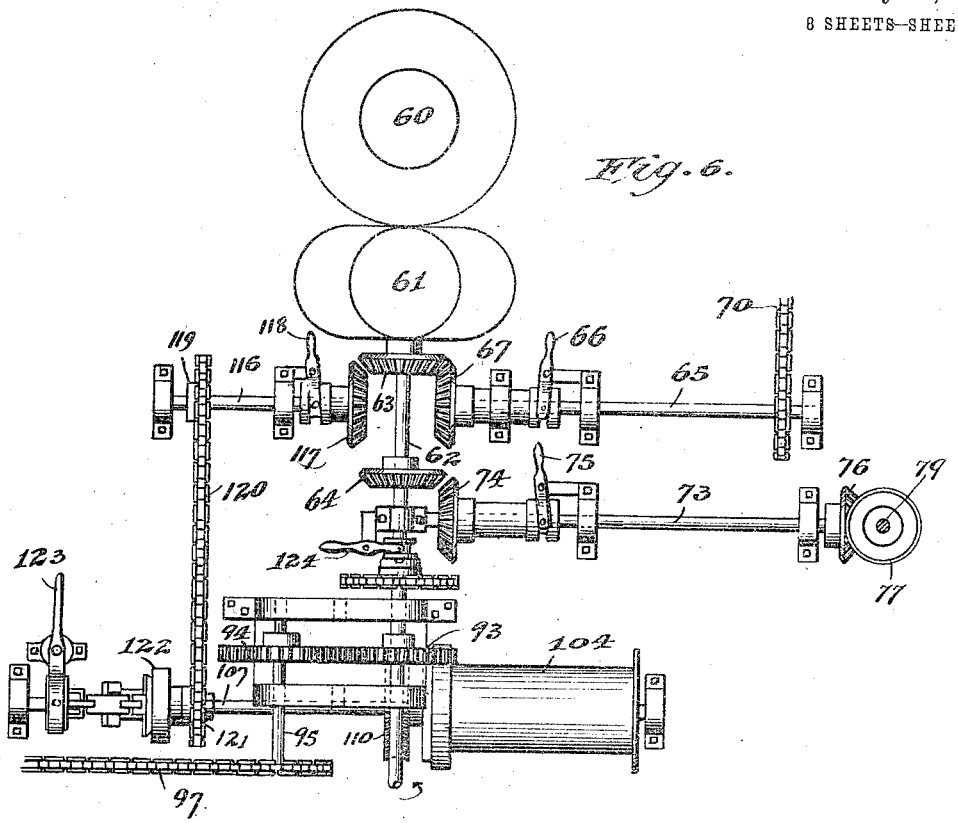
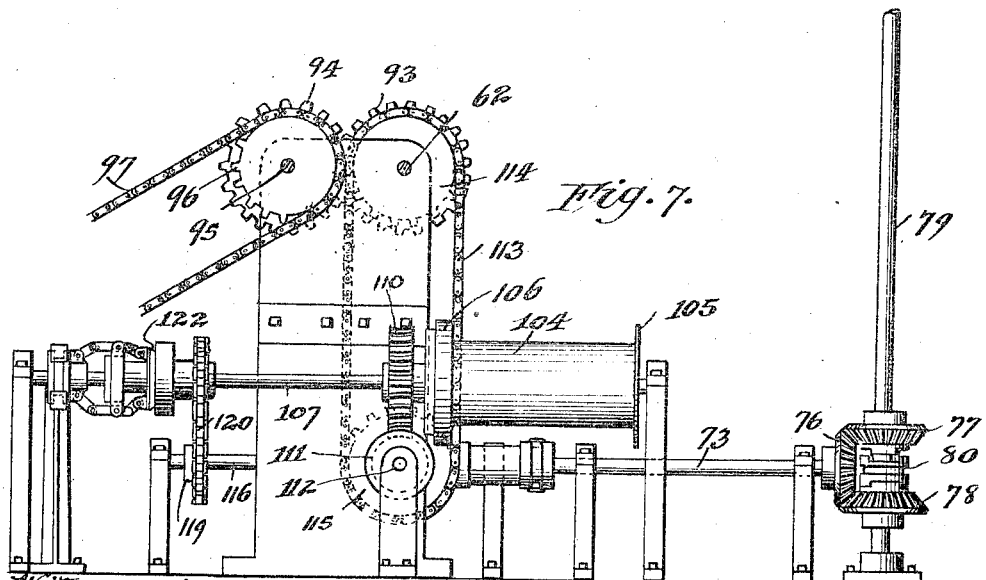

C. C. JACOBS.
EXCAVATOR.
APPLICATION FILED APR. 3, 1908.
1,032,834.
Patented July 16, 1912.
8 SHEETS—SHEET 6.
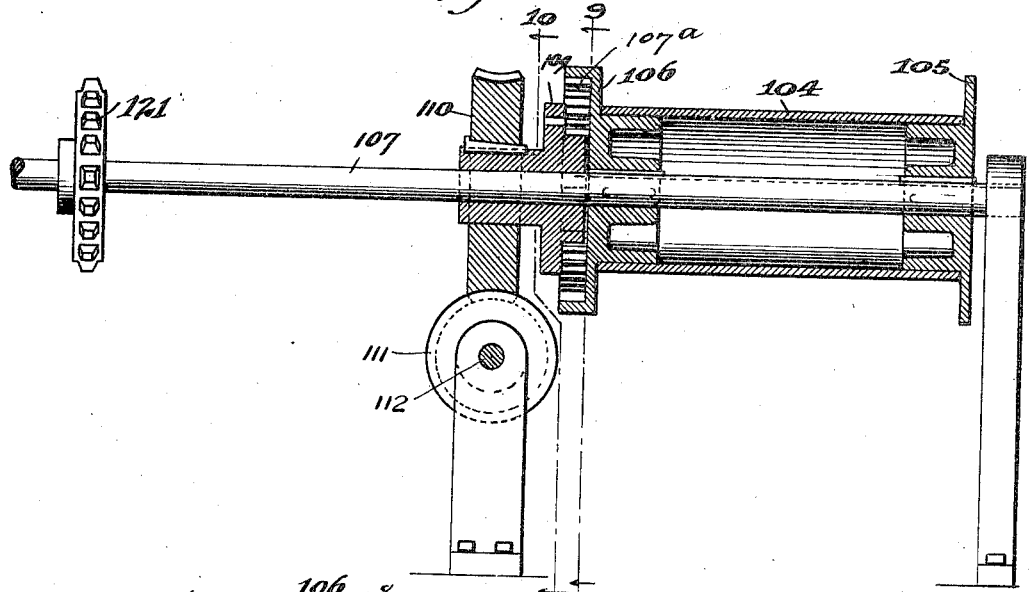
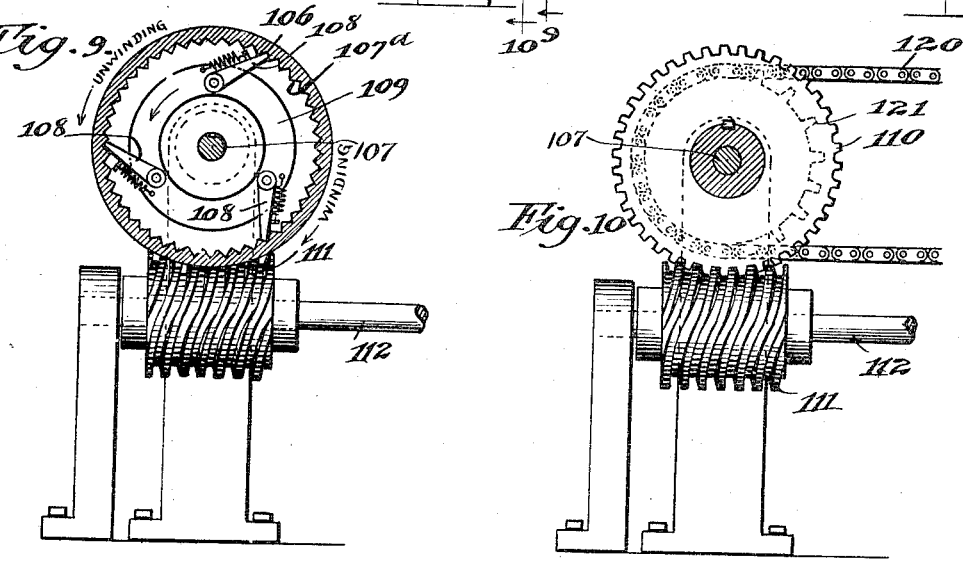

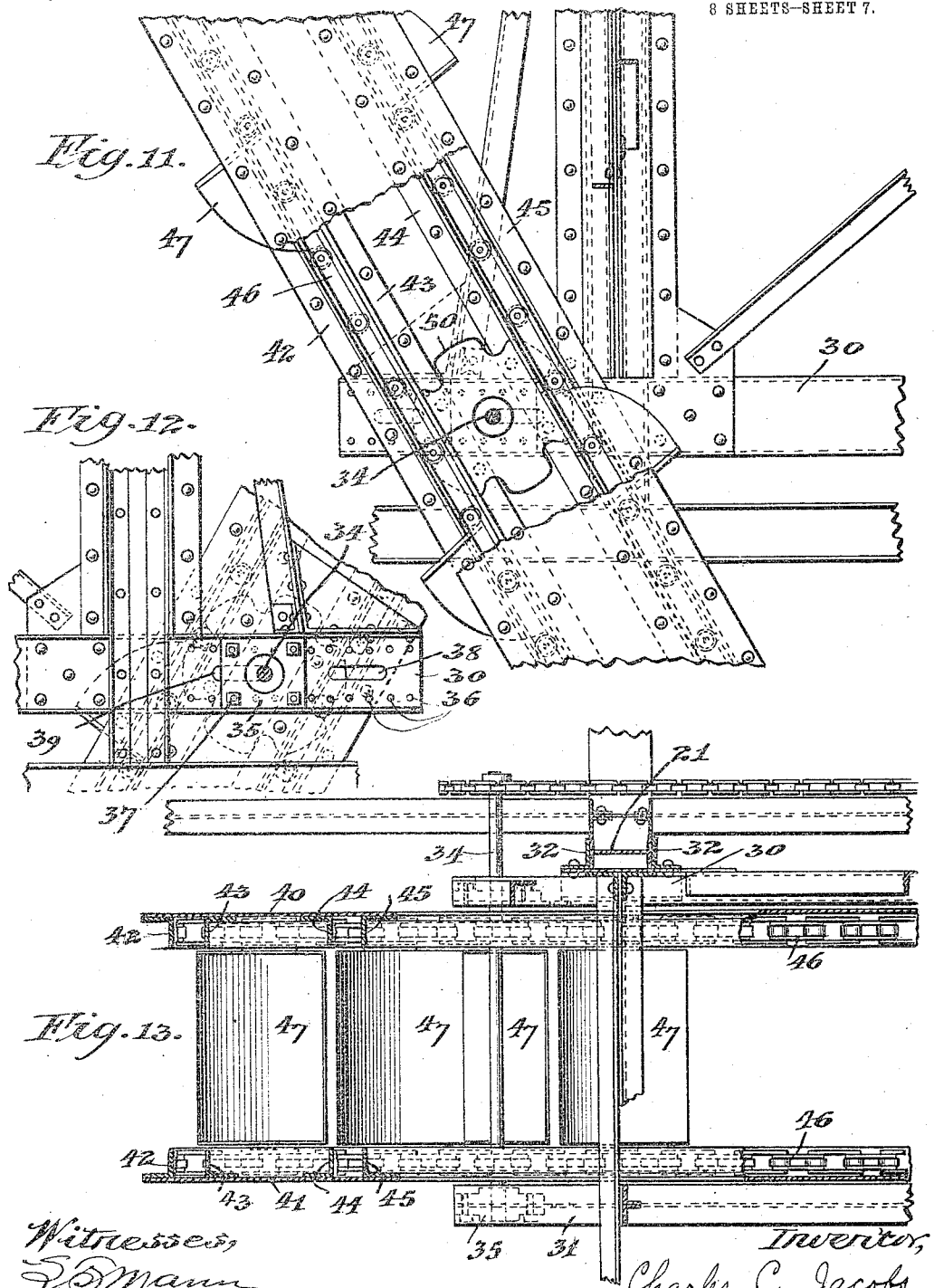

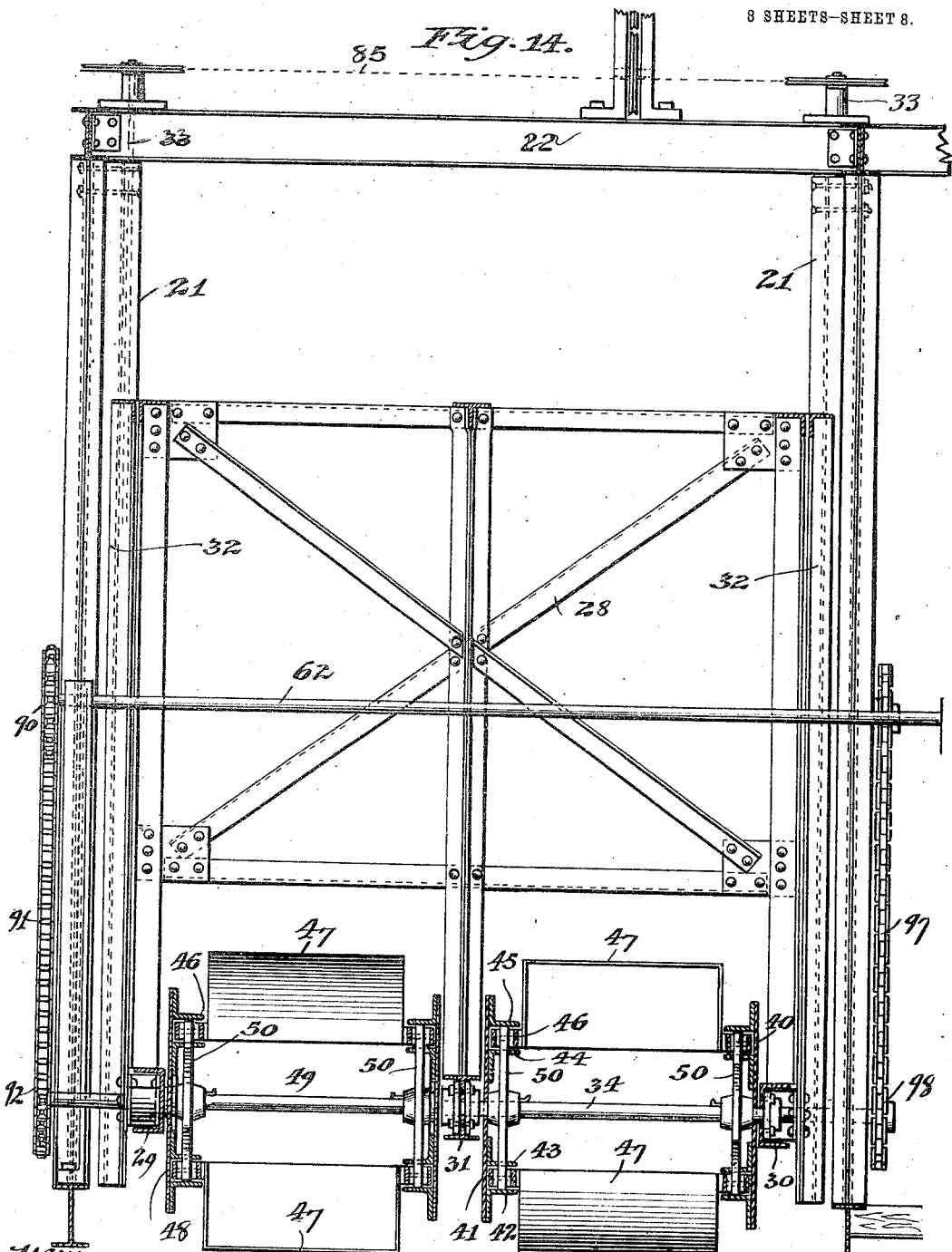

UNITED STATES PATENT OFFICE.

CHARLES C. JACOBS, OF CHICAGO, ILLINOIS, ASSIGNOR TO F. C. AUSTIN DRAINAGE EXCAVATOR COMPANY, OF CHICAGO, ILLINOIS, A CORPORATION OF ILLINOIS.

EXCAVATOR.

1,032,834.

Specification of Letters Patent.  Patented July 16, 1912.

Application filed April 3, 1908. Serial No. 425,044.

*To all whom it may concern:*

Be it known that I, CHARLES C. JACOBS, a citizen of the United States, residing at Chicago, in the county of Cook and State of Illinois, have invented certain new and useful Improvements in Excavators, of which the following is a specification.

My invention relates to improvements in ditch or trench excavators and similar machines, and concerns especially a type of machine having one or more hinged or similarly mounted bucket supporting and guiding trackways on which travel sharp-edged open-mouthed buckets or shovels to scrape out or excavate the dirt from the trench and deliver it on the banks.

The objects and advantages of my present invention are made apparent from the following description and claims, and from the accompanying drawings, forming a part of this specification, in all the views of which like reference characters refer to the same parts throughout.

On said drawings—Figure 1 is a side elevation of my improved excavator; Fig. 2 is a plan view of the same; Fig. 3 is an end elevation of the machine; Figs. 4 and 5 are details of the scraping and dumping mechanisms for the buckets or shovels at the upper ends of the trackways; Figs. 6, 7, 8, 9, and 10 are details of the operating mechanisms for the excavator, Figs. 9 and 10 being sections on lines 9—9 and 10—10 of Fig. 8; Figs. 11 and 12 are enlarged views of portions of the excavator illustrating the structural details; Fig. 13 is a partial section and partial plan of the portion of the structure shown in Fig. 11; and Fig. 14 is a vertical cross-section illustrating in detail the construction of the vertically-adjustable frame within the main frame and the driving means for the excavator buckets, both trackways being in horizontal position.

The main frame, having four upright posts 21, top horizontal bars 22, lower horizontal beams 23, and suitable inclined braces 24, is mounted on a plurality of rollers or wheels 25 on shafts 26, the rollers and frame being adapted to travel on rails 27 laid on the ground temporarily alongside and longitudinally of the proposed trench. Vertically-adjustable and slidable within the main supporting frame, and guided in its vertical movements by the posts 21, is an inner track-supporting frame 28 (Figs. 1 and 14) having at its lower portion the parallel channel bars 29 and 30 and the intermediate beam 31. Angle bars 32 fastened to the frame 28 overlap the sides of the vertical posts 21 and guide the inner track supporting frame 28 in its vertical movements, which are occasioned by the rotation of vertical screws 33 which pass through nuts fixed to the inner frame, as is fully and clearly set forth in my former Patent No. 832,609, granted October 9, 1906. Near one end of the inner adjustable frame 28 is a cross supporting shaft 34 (Figs. 11, 12 and 13) rotatable in suitable bearings 35 adjustably mounted on the beams 30 and 31, a number of holes 36 being provided on the beams for the accommodation of the bolts 37 which hold the bearings in place, the beams being also slotted as at 38 and 39 for the accommodation of the shaft 34 in any one of a plurality of adjusted positions. Rotatable on this shaft and properly spaced apart are a pair of straight track plates 40 and 41 each having riveted to its inner face near its opposite longitudinal edges two pairs of angle bars 42—43 and 44—45, the two bars of each pair being spaced apart sufficiently to accommodate between their inwardly-extended flanges the links and rollers of a pair of sprocket chains 46 which act as a supporting and driving means for a number of sharp-edged open-mounted excavator buckets or shovels 47. A similar trackway 48 equipped with sprocket chains and excavator shovels 47 is likewise rotatably mounted on a transverse shaft 49 rotatable in adjustable bearings located at the opposite end of the inner vertically-adjustable frame. Each of the shafts 34 and 49 has fixed thereto so as to be rotatable therewith a pair of sprocket wheels 50, the teeth of which pass through slots in the angle bars, forming the trackway, and coöperate with the links of the sprocket chains so as to drive the same in the proper direction. The bucket-supporting and conveying chains 46 pass around similar sprocket wheels suitably mounted at the upper and lower ends of the trackways. The fixed upper shaft 51 on which the upper sprocket wheels 52 loosely turn, has fixed thereto a scraper supporting plate 53 on which is slidingly mounted, and projected outwardly by the springs 54 fastened to suitable pins 55 and 56, a sharp-edged scraper 57 adapted to pass through each bucket as it turns around the shaft 51 and scrape out any of its contents which may not have been dislodged. The curved back walls 58 of the buckets retain the loads in the buckets during their upward travel, but as the buckets or shovels pass around the upper sprocket wheels the buckets open up, as is clearly indicated in Fig. 4, and discharge their loads, since the side walls of each bucket are fastened to only a single pair of links.

On the platform 59 of the main frame is mounted a steam boiler 60 and a steam engine 61 of the usual type for driving a divided main shaft 62 having fixed thereto and rotatable therewith the two bevel gears 63 and 64. Slidable on a cross-shaft 65 by means of an operating handle 66 is a bevel gear 67 which may be slid into and out of mesh with the gear 63 as the operator desires. A sprocket wheel 68 on the shaft 65 is connected to a similar sprocket wheel 69 on one of the supporting roller shafts 26 by means of a sprocket chain 70, the forward and rear roller shafts 26 being connected together by sprocket chains 71 and 72 engaging suitable wheels on the two shafts, as is clearly illustrated in Fig. 2. It will be obvious, therefore, that when the gear 67 is thrown into mesh with the gear 63 the whole excavator may be caused to travel forwardly or rearwardly on the temporary rails 27, depending upon the direction of rotation of the engine. This travel of the excavator is, of course, necessary to bring the excavating buckets or shovels and their trackways over undug sections or portions of the trench, and after such travel of the parts the trackways may be turned, by mechanism hereinafter described, on their supporting shafts so that their buckets will shave off successive layers of dirt and deliver the same on the banks. Another cross-shaft 73 has on its inner end a similar slidable gear 74 controlled by a handle 75 and adapted to be thrust into and out of mesh with the gear 64, as is obvious, the other end of the shaft being equipped with a bevel pinion 76 located between and meshing with the teeth of a pair of bevel gears 77, 78 loosely mounted on an upright rotatable shaft 79, either of which is adapted to be coupled or clutched to the shaft by the clutch mechanism 80 so as to cause the vertical shaft to rotate in one direction or the other. The top end of shaft 79 is provided with a pair of sprocket wheels 81 and 82, (Fig. 3) the latter of which is connected to the adjacent upright screw 33 by means of a sprocket chain 83 (Fig. 2) passed therearound and around a similar sprocket wheel 84 on the top of the screw. An additional chain 85 co-acting with other sprocket wheels on the top of this screw and the corresponding outer screw causes their simultaneous rotation. The other sprocket wheel 81 on the top of shaft 79 is connected by a sprocket chain 86 (Fig. 2) to a sprocket wheel on an intermediate short upright shaft 87, the rotation of the latter shaft being transmitted by another sprocket chain 88 and suitable wheels to the other inner upright screw 33, its rotation in turn being conveyed to the remaining screw 33 by an additional sprocket chain 89 and co-acting sprocket wheels. Obviously, then, the inner vertically-adjustable frame 28, whose movements are occasioned by the rotation of the four vertical screws 33, may be raised or lowered by throwing the gear 74 into mesh with its companion gear 64 and clutching one or the other of the gears 77 or 78 with intermediate gear 76, whereby the rotation of the main shaft 62 is simultaneously conveyed to all of the upright screws.

In order to rotate the shafts 34 and 49 to drive the sprocket chains 46 and their attached buckets by means of the large sprocket wheels 50 fixed to the shafts, I provide the mechanism described below. On the outer end of shaft 62 a sprocket wheel 90 (Figs. 1 and 2) is provided which transmits the motion of the main shaft to the trackway shaft 49 through a connecting sprocket chain 91 passing around a similar sprocket wheel 92 on the end of shaft 49. The rotation of shaft 62 is transmitted through the intermeshing gears 93 and 94 (Fig. 6) to a jack shaft 95 having on its outer end a sprocket wheel 96 connected by a chain 97 to a similar sprocket wheel 98 on the outer end of the trackway shaft 34. It is apparent from this construction that the rotation of shaft 62 is transmitted to both of the shafts 34 and 49 and to the sprocket chains carrying the sharp-edged excavator buckets or shovels so as to bring them in the proper direction to dig out the earth from the trench and discharge it upon the banks.

It will be noticed that the track-ways are not balanced on their supporting shafts 34 and 49, the upper portions overbalancing the lower portions, so that if they were allowed to turn freely on their shafts the portions in the trench would be raised out thereof by being overbalanced by the upper dumping portions of the track-way, and would assume a horizontal position. It is to be understood that as the excavating proceeds, the track-ways are turned on their pivot or hinge shafts by successive small steps, lowering the excavating portions of the track-ways into the trench so that the buckets may scrape off and excavate successive layers of dirt. For the accomplishment of this the top ends of the track-ways have fastened thereto cables 99 and 100, respectively (Figs. 1 and 2) which pass around guide-sheaves 101, 102, and 103 to a winding drum 104, (Figs. 6, 7, and 8) the heads 105 and 106 of which are keyed on a shaft 107 rotatably mounted in suitable bearings. On the platform of the excavator is another rotatable cross-shaft 116 (Fig. 6) carrying a bevel gear 117 controlled by a handle 118 and adapted to be thrown thereby into and out of mesh with the gear 63 on the main driving shaft 62. Fast on shaft 116 is a sprocket-wheel 119 with which coöperates a sprocket chain 120 passing around a similar sprocket-wheel 121 loosely mounted on drum-shaft 107 and adapted to be clutched thereto by the friction clutch mechanism 122 operated and controlled by a handle 123. By this mechanism the winding cables 99 and 100 may be gradually wound up on the drum 104 as the excavating proceeds.

After the trench has been dug to the full required depth, the hinged track-ways are permitted to swing outwardly at their upper ends to approximately a horizontal position in order to raise their lower excavating portions to a new position above a fresh section of the trench to be dug. The superior weight of the upper portions of the track sections effects this movement, and the movement is controlled to avoid sudden jars and strains by the following mechanism which permits the gradual unwinding of the cables 99 and 100 from the drum 104. The head 106 of the drum has internal ratchet or clutch teeth 107ᵃ (Fig. 9) with which co-act a plurality of pivoted spring-pressed detents 108 hinged on a sleeve 109 loosely mounted on the shaft 107 and having keyed to its outstanding hub a worm-wheel 110 which meshes with a worm 111 fixed on a shaft 112 below and at right-angles to the shaft 107. A sprocket-chain 113 (Fig. 7) encircling the sprocket-wheels 114 and 115 fast on the shafts 62 and 112, respectively, transmits the rotation of the upper shaft 62 to the lower worm-shaft 112, the section of shaft 62 carrying the sprocket 114 having a clutch-controlled connection with the constantly driven section through an operating lever or handle 124 (Fig. 6). To pay out the cables 99 and 100 from the drum, so as to bring the excavating parts of the track-way out of the ditch, the drive of the drum through shafts 116 and 107 and sprocket-chain 120 is disconnected by operating either of the levers 118 or 123, and the lever 124 is actuated to operatively connect the sprocket 114 with the inner or main driven section of shaft 62, whereby the sleeve 109 carrying the detents 108 is caused to rotate in the unwinding direction of the drum 104, acting as a controller or brake to regulate the speed at which the cables are unwound under the gravity impulse of the track-ways, preventing a sudden or sharp dropping movement of the latter. As soon as the machine has been advanced to a new position over the line of the trench, the drive of the detent mechanism is disconnected from the motor by lever 124, and the drive to the winding-drum is again connected up by levers 118 and 123, and the operation proceeds as before.

To those skilled in the art it will be apparent that numerous minor mechanical and structural changes may be made in the machine shown and described without departure from the substance and essence of my invention as set forth in the appended claims.

I claim:

1. In an excavator, the combination of a rigid main frame having vertical corner posts, a track-supporting frame vertically adjustable and slidable within said main frame on said corner posts, a pair of oppositely inclined track-ways pivotally mounted between their ends on opposite ends of said track-supporting frame, said track-ways diverging from their lower to their upper ends, endless chains carrying sharp-edged buckets operatively mounted on said track-ways, respectively, means for driving said bucket-carrying chains, and means for varying the degree of divergence of said track-ways as the work proceeds, substantially as described.

2. In an excavator, the combination of a rigid main frame having vertical corner posts, a track-supporting frame vertically adjustable and slidable within said main frame on said corner posts, a pair of rotatable shafts mounted at opposite ends of the bottom portion of said track-supporting frame, a pair of oppositely inclined track-ways pivoted between their ends on said shafts, respectively, said track-ways diverging from their lower to their upper ends, driving-sprockets fast on said shafts, idler-sprockets on the opposite ends of said track-ways, endless chains mounted on said sprockets and carrying sharp-edged buckets, means for driving said shafts, and means for varying the degree of divergence of said track-ways as the work proceeds, substantially as described.

3. In an excavator, the combination of a rigid main frame having vertical corner posts, a track-supporting frame vertically adjustable and slidable within said main frame on said corner posts, a pair of oppositely inclined track-ways pivotally mounted below their longitudinal centers on opposite ends of said track-supporting frame, said track-ways diverging from their lower to their upper ends, endless chains carrying sharp-edged buckets operatively mounted on said track-ways, means for driving said bucket-carrying chains, a winding drum, cables leading from said winding drum to the upper ends of said track-ways, respectively, and means for operating said winding drum whereby to effect and control the angular adjustment of said track-ways as the work proceeds, substantially as described.

4. In an excavator, the combination of a rigid main frame having vertical corner posts, a track-supporting frame vertically adjustable and slidable within said main frame on said corner posts, a pair of oppositely inclined track-ways pivotally mounted below their longitudinal centers on opposite ends of the bottom portion of said track-supporting frame, said track-ways diverging from their lower to their upper ends, endless chains carrying sharp-edged buckets operatively mounted on said track-ways, a motor having a main driving shaft mounted on said main frame, clutch-controlled actuating connections between said motor-shaft and the adjusting means of said track-supporting frame, clutch-controlled driving connections between said motor shaft and said bucket-carrying chains, and clutch-controlled actuating connections between said motor-shaft and the upper ends of said track-ways for varying the angular positions of the latter as the work proceeds, substantially as described.

CHARLES C. JACOBS.

Witnesses:
WALTER M. FULLER,
L. F. McCREA.